United States Patent [19]

Rice

[11] 4,296,770
[45] Oct. 27, 1981

[54] FREEZE DRAIN VALVE

[75] Inventor: Robert A. Rice, Chicago, Ill.

[73] Assignee: Eaton Corporation, Cleveland, Ohio

[21] Appl. No.: 116,368

[22] Filed: Jan. 28, 1980

[51] Int. Cl.³ .................. F16K 17/00; G05D 23/02
[52] U.S. Cl. ............................ 137/62; 60/527;
236/100; 237/80; 251/11; 251/77; 251/85
[58] Field of Search ............... 137/62; 60/527;
236/100; 237/80; 251/11, 294, 77, 85

[56] References Cited

U.S. PATENT DOCUMENTS

| | | | |
|---|---|---|---|
| 1,338,469 | 4/1920 | Waage et al. | 137/62 |
| 2,085,876 | 7/1937 | Steen | 251/294 |
| 2,130,796 | 9/1938 | Grayson | 251/85 |
| 3,118,648 | 1/1964 | Campbell | 251/77 |
| 3,446,226 | 5/1969 | Canterbury | 137/62 |
| 3,860,169 | 1/1975 | Norman | 251/11 |
| 3,887,159 | 6/1975 | Obermaier et al. | 251/11 |
| 4,036,433 | 7/1977 | Wagner et al. | 251/11 |
| 4,066,090 | 1/1978 | Nakajima et al. | 137/62 |

FOREIGN PATENT DOCUMENTS 372887 12/1963 Switzerland ................ 251/294

*Primary Examiner*—Martin P. Schwadron
*Assistant Examiner*—G. L. Walton

*Attorney, Agent, or Firm*—R. J. McCloskey; R. A. Johnston

[57] ABSTRACT

A temperature responsive drain valve (10) is disclosed for draining fluid lines (12) to prevent freeze up damage. The valve includes a housing (14) having a fluid passageway (15) therethrough. A temperature responsive thermal actuator (20) is mounted to the housing adjacent fluid inlet passageways (34). The actuator includes a temperature sensitive portion (22,23), which extends exteriorly of the valve housing and an output member which extends into the fluid passageway. A poppet valve member (42) has a self-aligning valve surface (46) and is mounted in the fluid passageway and biased toward a valve seat by a conical spring (47) which extends over a cylindrical portion (43) of the valve member. Cylindrical portion (43) is also guided by and extends through an opening (49) in a reaction plate (48). An outer biasing spring (51) reacts against the output member through a cage arrangement (54, 58, 67). A flexible bead chain (62) is connected between valve member (42) and the cage arrangement and functions as a lost motion connection, thereby allowing the output member of the thermal actuator to move outwardly toward the poppet valve member without overloading the valve member and thermal actuator.

12 Claims, 2 Drawing Figures

FREEZE DRAIN VALVE

BACKGROUND OF THE INVENTION

This invention relates to drain valves for use in draining water systems to prevent damage to piping and associated equipment from water freeze-up.

DESCRIPTION OF THE PRIOR ART

Temperature responsive valves are presently in widespread use in a variety of applications and include automotive type thermostatic valves and heavy duty steam trap valves. These valves incorporate thermally responsive actuators which have means, for example, an encapsulated wax type compound which experiences a solid to liquid phase change, and consequent volumetric change, in response to temperature changes.

Various complicated spring mounting arrangements have been employed in known valves for transferring output motion of the actuator to a valve member for either opening or closing the valve member. In one type of known valve, overtravel of the thermal actuator is compensated for by employing lost motion spring mounting arrangements.

Furthermore, there has arisen a need for a low cost drain valve which will remain normally closed at temperatures above a predetermined value and which will open automatically in response to sensed fluid temperatures below the predetermined value for draining fluid from the fluid line to which the valve is connected. The valve must have the capacity to compensate for expansion of the thermal actuator as temperatures are sensed above the predetermined value and, without damage to the valve and thermal actuator, maintain the valve in a closed position.

SUMMARY OF THE INVENTION

In the present invention a temperature responsive drain valve connectable to a fluid carrying conduit is provided which remains closed as temperatures are sensed above a predetermined value and which opens upon temperatures being sensed below a predetermined value generally above the freezing point of water. The low cost of the present valve makes it especially desirable for use in nonindustrial water piping systems, for example those systems associated with irrigation and solar energy heat exchangers.

The present valve comprises a thermally responsive actuator connected to the valve housing adjacent the fluid inlet end of the valve. The output end of the actuator extends within the fluid passageway in the housing while the temperature sensitive end extends exteriorly of the housing for efficiently sensing fluid temperature in the conduit requiring drainage.

A normally closed spring loaded poppet valve arrangement is mounted within the passageway adjacent the valve outlet. The poppet valve has a spherical valve surface formed on one end thereof and a cylindrical stem portion on the other end which extends through a guide passageway provided in a disc shaped reaction plate. The valve member is biased to a closed position by a conical biasing spring which also, in cooperation with the reaction plate, functions to maintain the valve member in alignment relative to a valve seat formed around the valve outlet orifice.

An output member of the actuator is connected to one end of the poppet valve by means of a bead chain or other suitable flexible member, for example, a cable. This feature of the invention allows the thermal actuator to expand to its maximum length while the valve is in the closed position without transferring a damaging compressive load to the poppet valve member.

As the fluid temperature sensed by the actuator approaches the freezing point of water the thermal actuator contracts, whereupon a biasing spring moves the actuator output member inwardly which takes up the slack in the bead chain. As the tension load on the bead chain increases, the poppet valve member is moved away from its valve seat, thereby allowing fluid flow through the valve outlet. The flexible bead chain thus functions as a low cost lost-motion element which replaces more costly spring arrangements.

It is accordingly an object of the invention to provide a low cost drain valve for use in water lines for preventing freeze damage.

It is another object of the invention to provide a temperature responsive drain valve for opening the valve at temperatures below a predetermined value.

It is another object of the invention to provide a drain valve having a low cost self-aligning poppet valve assembly.

DETAILED DESCRIPTION

Figure 1:
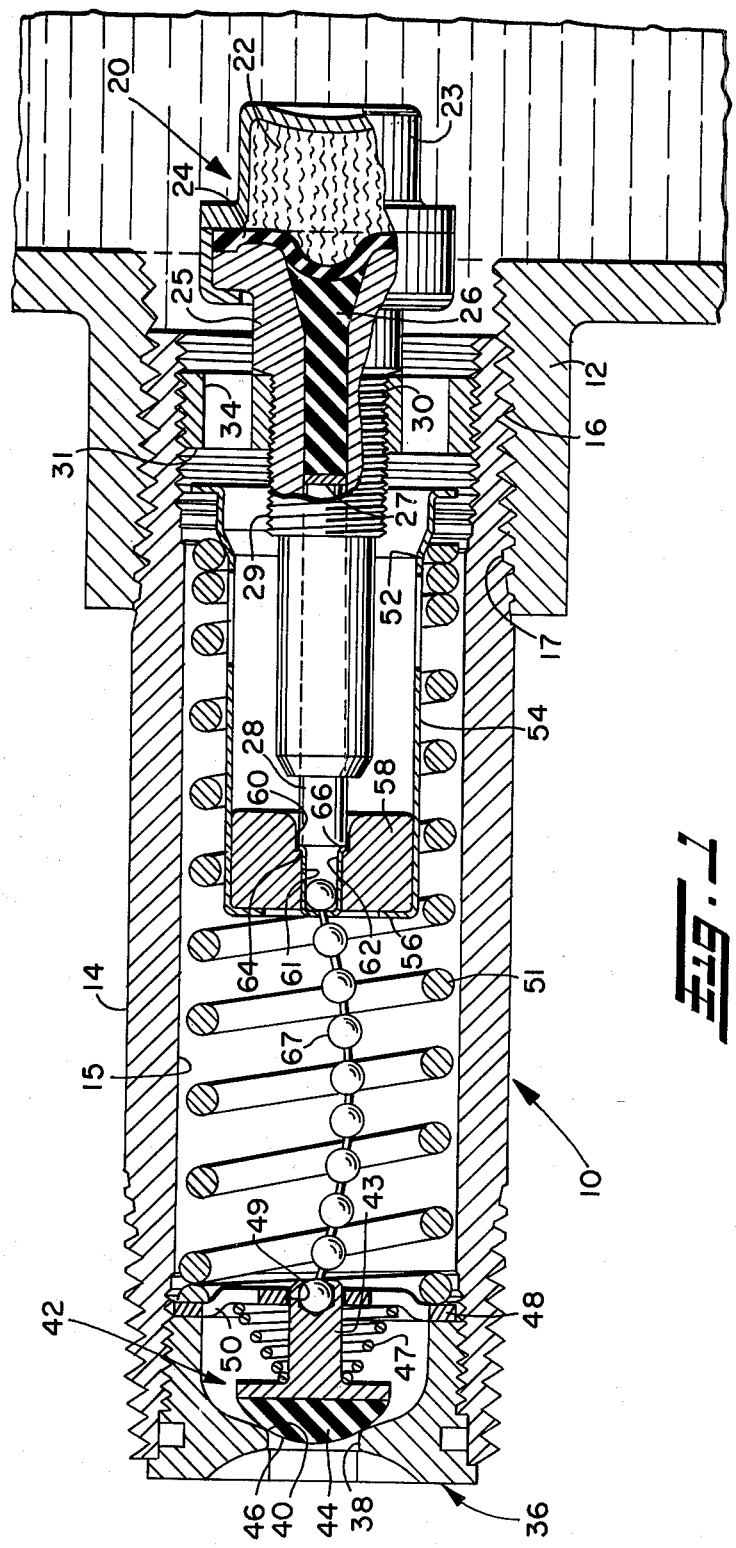
FIG. 1 is a view of a valve embodying the principles of the invention shown in association with a water system fluid line and wherein the valve is shown in a closed position.
Figure 2:
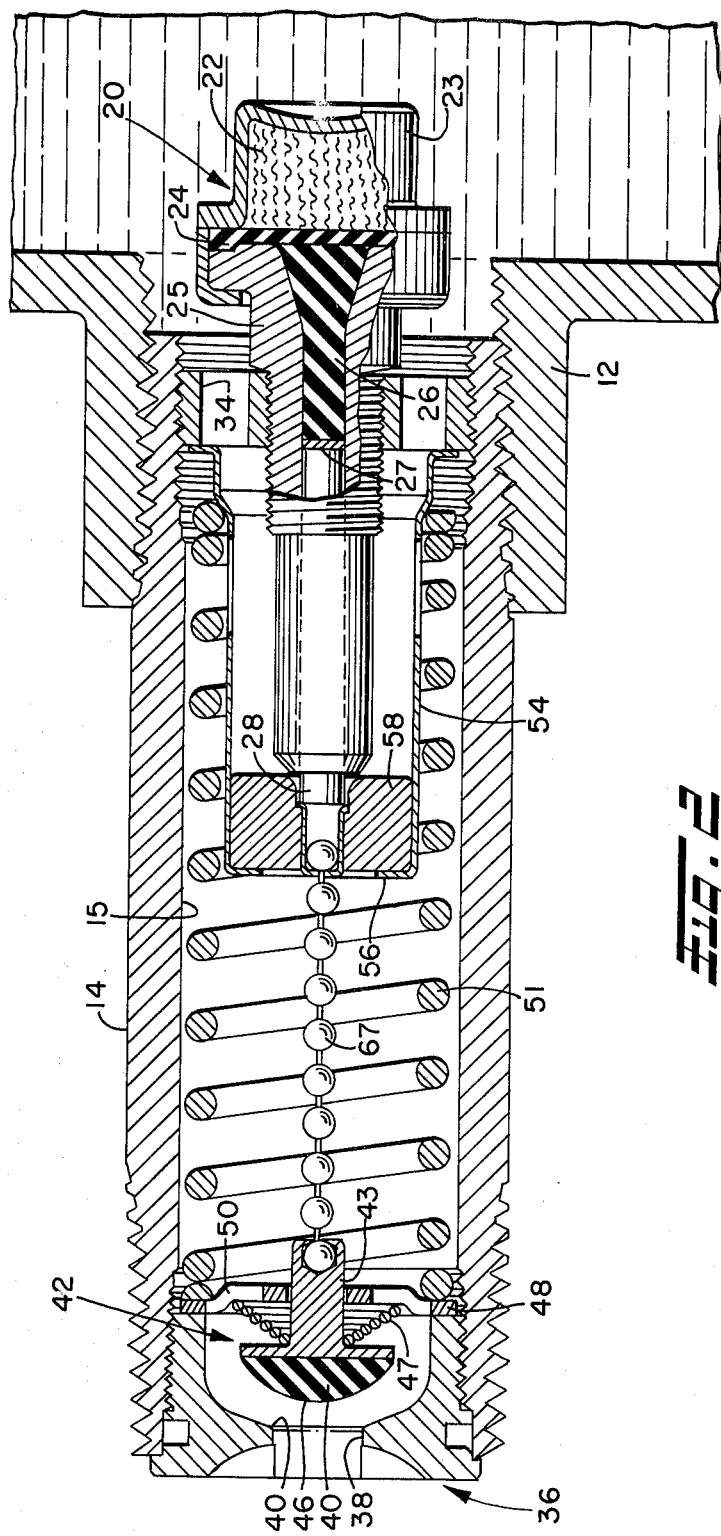
FIG. 2 is a view similar to FIG. 1 illustrating the valve in an open position.

Referring now to FIGS. 1 and 2, there is shown a valve, indicated generally at 10, embodying the principles of the invention connected to a nipple portion of a water line 12. Valve 10 comprises an elongated tubular housing 14 which defines a fluid passageway 15 therethrough. An external pipe thread portion 16 is formed on the inlet end of the housing for connecting the valve to a corresponding internal pipe thread 17 at a suitable drainage location along line 12. A thermally responsive power element, indicated generally at 20, is of a type well known in the art and includes a temperature sensitive wax compound 22 encapsulated in a cup 23 and sealed therein by a flexible sealing diaphragm 24. A guide element 25 is seated over the diaphragm and held in place by a crimped portion of cup 23. A rubber plug 26 conforms to a bore in guide element 25 and has one end in contact with diaphragm 24 and the other end abutting an antichafing ring 27. An output member 28 is slidably received in a bore in guide 25 and has an inner end in contact with antichafing ring 27. A threaded portion 29 on guide 25 is threadedly connected to an internally threaded portion 30 formed in an end wall member 31 which is in turn threadedly connected to an internal thread in housing 14. A plurality of inlet fluid passageways 34 are formed through end wall 31 for permitting fluid flow through the valve from water line 12.

A threaded valve insert, indicated generally at 36, is connected to the outlet end of the valve and has formed therethrough a fluid outlet port 38. A seal ring 37 is mounted in an annular groove 39 formed in insert 36 and functions to seal the interface between insert 36 and housing 14. A valve seat 40 is defined by the inside peripheral edge of port 38. A poppet valve member, indicated generally at 42, is engageable with valve seat 40 and includes a cylindrical stem portion 43 and a rubber button shaped portion 44 having a spherical valve surface 46. A conical biasing spring 47 has a minor diameter end portion received over valve stem portion 43 and a major diameter portion seated against a thin walled reaction plate 48 which is received in passageway 15 and in abutment with the right-hand end face of insert 36. Spring 47 functions of maintain valve poppet 42 seated against valve seat 40 as thermal actuator 20 senses temperatures above a predetermined operating set point.

A central opening 49 is formed in plate 48 and functions to radially align stem portion 43 with valve seat 40. An annular shoulder 50 is formed into the left side of plate 48 and functions to radially align the major diameter end of conical spring 46. This structure results in a low cost, self-aligning mounting arrangement for valve member 42.

A means for axially preloading output member 28 toward the right relative to FIGS. 1 and 2 is provided by a compression spring 51 received in passageway 15 and has the left end thereof seated against reaction plate 48 and the right end thereof seated against a shoulder portion 52 formed on an outer cage 54. An inwardly turned flanged portion 56 is formed on the left end of cage 54 and reacts against a cylindrically shaped guide member 58 which is received within cage 54. The outer end of output member 28 extends partially into a bore 60 formed in guide 58. A thin walled, cup-shaped insert 62 is received in a bore 61 in guide 58 and includes a flanged portion 64 on the right end thereof which abuts against a shoulder 66 formed in guide 58 intermediate bores 60 and 61. The compressive load exerted by spring 51 functions to maintain reaction plate 48 seated against the right face of insert 36 and also maintain cage 54, guide 58, and the right face of flanged portion 64 biased toward the left end face of output member 28.

In the preferred form of the invention, a flexible bead chain 67 has one end connected to stem portion 43 of valve member 42 by crimping the tubular outer end of 43 over one end bead. The other end of the bead chain is connected to insert 62 by forming the left end thereof inward radially between adjacent beads. It should be noted that other suitable flexible connectors can be used in place of the bead chain, for example a flexible cable, without departing from the scope of the invention.

In operation, thermally responsive drain valve 10 functions to open poppet valve member 42 as temperatures are sensed below a predetermined operating set point temperature. In the preferred form of the invention the the temperature sensitive wax compound is formulated to contract around 42 degrees Fahrenheit (5.8 degrees Centigrade) whereupon compression spring 51 forces output member 28 to the right by reacting through cage 54, guide member 58, and insert 62. As output member 28 moves to the right, bead chain 52 is placed in tension an amount sufficient to overcome biasing spring 46 and move poppet valve member 42 to the right, thereby opening valve 10. FIG. 2 illustrates the valve in the open position.

As temperatures are sensed above the operating set point, the thermally expansible compound liquifies and expands forcing output member 28 to move to the left. The force generated by actuator 20 acting through output member 28 is sufficient to overcome the preload force of spring 51, resulting in slackening of bead chain 62. The slack in chain 62 allows biasing spring 46 to seat valve poppet member 42 against valve seat 40, thereby placing the valve in a closed position. The lost motion effect achieved by bead chain slackening permits continued expansion of thermal actuator 20 without damage to the poppet valve member and thermal actuator.

The embodiment of the invention as shown and described above is representative of the inventive principles stated herein. It is to be understood that variations and departures can be made from the embodiment shown without, however, departing from the scope of the appended claims.

What is claimed is:

1. A temperature responsive valve for connection to a fluid conduit, said valve comprising:
    (a) housing means defining a fluid chamber having an inlet and an outlet in communication therewith, said inlet being adapted for connection to a fluid conduit;
    (b) valve means disposed without said chamber adjacent said outlet and including means movable between a first position effecting blockage of fluid flow from said inlet to said outlet and a second position enabling such fluid flow;
    (c) means biasing said movable means to said first position;
    (d) temperature sensitive means associated with said housing means and disposed adjacent said inlet, said temperature sensitive means operative to sense the temperature of fluid at said inlet and including actuator means movable with respect to said housing means in response to said sensed fluid temperature; and,
    (e) tension means operatively connecting said actuator means to said movable means wherein said tension means normally exerts no force on said movable means, but upon said temperature sensitive means experiencing fluid temperatures less than a predetermined value, said tension means enables said actuator means to move said movable means to said second position and at all fluid temperatures above said predetermined value said tension means is inoperative to transmit force from said actuator means to said movable means.

2. The device as defined in claim 1, wherein said temperature responsive actuator means includes a temperature sensitive portion extending exteriorly of said housing means for sensing fluid temperatures in said conduit.

3. The device as defined in claim 1, wherein said tension means includes a bead chain, said bead chain having one end thereof connected to said valve means and the other end thereof movable with said actuator means.

4. The device as defined in claim 1 wherein said actuator means includes,
    (a) an output member;
    (b) a compression spring disposed within said fluid passageway;
    (c) cage means disposed within said fluid passageway, said compression spring biasing said cage means against said output member such that said cage means moves therewith;
    (d) means for supporting said cage means on said output member, said support means including
        (i) a guide member received within said cage means, said guide member having a bore therein, (ii) a cup-shaped insert received over said output member and extending into said guide member bore, (iii) said insert and said output member defining abutting surface portions for transmitting axial loading to said output member.

(iv) said insert and said guide member defining abutting surface portions for transmitting axial loading to said guide member.

5. The device as defined in claim 1, wherein (a) said housing means includes a valve insert member connected to one end of said housing means, said insert member having said outlet and a valve seat formed therein;

(b) a reaction plate disposed in said fluid passageway and in abutment with said valve insert member, said reaction plate having a centrally located guide opening and fluid passageways fromed therethrough;

(c) said valve member disposed intermediate said valve insert and said reaction plate, said valve member having (i) a first cylindrical portion at one end thereof extending into and guided by said guide opening, (ii) a self aligning valve surface portion at the other end thereof, (iii) a shoulder portion extending outward radially from said cylindrical portion and spaced from said one end; and (d) said valve member biasing means is a conical spring having a major diameter end in abutment with said reaction plate and a minor diameter end received over said cylindrical portion and in abutment with said shoulder portion.

6. The valve defined in claim 1, wherein said temperature sensitive means includes an encapsulated temperature sensitive wax mixture.

7. The valve defined in claim 1, wherein (a) said valve means includes an annular valve seat, (b) said movable means includes a poppet having a semi-spherical seating surface movable for contacting said annular valve seat; and, (c) said tension means is operatively connected to said poppet.

8. A temperature responsive valve for connection to a fluid conduit, said valve comprising:

(a) housing means, said housing means defining (i) a fluid passageway therethrough, (ii) a fluid inlet in communication with said passageway, (iii) a fluid outlet in communication with the passageway, and (iv) a valve seat surrounding said fluid outlet;

(b) valve means disposed within said fluid passageway, said valve means including a valve member movable between a first position in which said valve means is seated against said valve seat for blocking flow through said fluid outlet and a second position spaced from said valve seat for permitting flow through said passageway and said outlet;

(c) means for biasing said valve member toward said first position;

(d) temperature responsive actuator means connected to said housing means, said actuator means disposed adjacent said fluid inlet for sensing fluid temperatures thereat, said actuator means having an output member movable with respect to said valve seat at sensed temperatures above a predetermined value;

(e) means for biasing said output member inwardly toward said actuator means, said biasing means operative to move said output member inwardly toward said actuator means and away from said valve member as temperatures are sensed by said actuator means below said predetermined value, said actuator means effective for overcoming said output member biasing means as temperatures are sensed above said predetermined value;

(f) means for connecting said valve member to said output member, said connecting means operative to permit said output member biasing means to overcome said valve member biasing means in response to inward movement of said output member and move said valve member to said second position, said connecting means exerting no force on said actuator means and permitting lost motion movement of said actuator means toward said valve member as temperatures are sensed by said actuator means above said predetermined value.

9. The device as defined in claim 8, wherein said temperature responsive actuator means includes a temperature sensitive portion extending exteriorly of said housing means for sensing fluid temperatures in said conduit.

10. The device as defined in claim 8, wherein said connecting means includes a bead chain, said bead chain having one end thereof connected to said valve member and the outer end thereof movable with said output member.

11. The device as defined in claim 8, wherein said output member biasing means includes (a) a compression spring disposed within said fluid passageway;

(b) cage means disposed within said fluid passageway, said compression spring biasing said cage means against said ouput member such that said cage means moves with said output member;

(c) means for supporting said cage means on said output member, said support means including (i) a guide member received within said cage means, said guide member having a bore therein, (ii) a cup-shaped insert received over said output member and extending into said guide member bore, (iii) said insert and said output member defining abutting surface portions for transmitting axial loading to said output member, (iv) said insert and said guide member defining abutting surface portions for transmitting axial loading to said guide member.

12. The device as defined in claim 8, wherein (a) said housing means includes a valve insert member connected to one end of said housing means, said insert member having said fluid outlet and said valve seat formed therein;

(b) a reaction plate disposed in said fluid passageway and in abutment with said valve insert member, said reaction plate having a centrally located guide opening and fluid passageways formed therethrough;

(c) said valve member disposed intermediate said valve insert and said reaction plate, said valve member having (i) a first cylindrical portion at one end thereof extending into and guided by said guide opening, (ii) a self aligning valve surface portion at the other end thereof,
(iii) a shoulder portion extending outward radially from said cylindrical porton and spaced from said one end; and
(c) said valve member biasing means is a conical spring having a major diameter end in abutment with said reaction plate and a minor diameter end received over said cylindrical portion and in abutment with said shoulder portion.

* * * * *

UNITED STATES PATENT AND TRADEMARK OFFICE
CERTIFICATE OF CORRECTION

PATENT NO. : 4,296,770
DATED : Oct. 27, 1981
INVENTOR(S) : Robert A. Rice, Chicago, Ill.

It is certified that error appears in the above-identified patent and that said Letters Patent are hereby corrected as shown below:

Column 4, line 20, cancel "without" and insert -- within --

Signed and Sealed this

Ninth Day of August 1983

[SEAL]

Attest:

GERALD J. MOSSINGHOFF

Attesting Officer

Commissioner of Patents and Trademarks